US005600214A

United States Patent [19]

Fromson

[11] Patent Number: 5,600,214

[45] Date of Patent: Feb. 4, 1997

[54] USER-CONTROLLABLE ADJUSTABLE MASSAGE BED

[75] Inventor: Leonard E. Fromson, Cerritos, Calif.

[73] Assignee: Maxwell Products, Inc., Cerritos, Calif.

[21] Appl. No.: 560,218

[22] Filed: Nov. 21, 1995

Related U.S. Application Data

[62] Division of Ser. No. 189,963, Jan. 31, 1994, Pat. No. 5,544,376.

[51] Int. Cl.[6] .......................... A47C 31/00; G05B 11/01; H04Q 7/00

[52] U.S. Cl. ................................ 318/120; 318/16; 5/915

[58] Field of Search ............................... 5/600, 607, 612, 5/613, 616, 617, 618, 619, 915; 318/16, 114, 119, 120, 128, 129, 130, 134, 264, 265, 286, 460, 466, 467, 468

[56] References Cited

U.S. PATENT DOCUMENTS

| | | |
|---|---|---|
| D. 187,923 | 5/1960 | Przybylowicz et al. . |
| D. 266,501 | 10/1982 | Stefanik . |
| D. 266,758 | 11/1982 | Johannsen et al. . |
| D. 293,669 | 1/1988 | Ogilvie . |
| D. 342,259 | 12/1993 | Darbee et al. . |
| D. 362,660 | 9/1995 | Fromson . |
| 3,137,773 | 6/1964 | Black . |
| 3,644,946 | 2/1972 | Swatt . |
| 3,711,664 | 1/1973 | Benoit . |
| 3,716,876 | 2/1973 | Petzon et al. . |
| 3,781,927 | 1/1974 | Zakaras . |
| 3,865,430 | 2/1975 | Tanus . |
| 3,872,526 | 3/1975 | Betts . |
| 3,913,153 | 10/1975 | Adams et al. . |
| 3,923,300 | 12/1975 | Tanus . |
| 3,932,903 | 1/1976 | Adams et al. . |
| 3,972,081 | 8/1976 | Stern et al. . |
| 4,014,344 | 3/1977 | Gutierrez . |
| 4,044,286 | 8/1977 | Adams et al. . |
| 4,062,075 | 12/1977 | Stern et al. . |
| 4,211,998 | 7/1980 | Junginger . |
| 4,218,681 | 8/1980 | Hormann . |

(List continued on next page.)

FOREIGN PATENT DOCUMENTS

| | | |
|---|---|---|
| 0178951 | 4/1986 | European Pat. Off. . |
| 0220708 | 5/1987 | European Pat. Off. . |
| 0228233 | 7/1987 | European Pat. Off. . |
| 0261830 | 3/1988 | European Pat. Off. . |
| 0302579 | 2/1989 | European Pat. Off. . |
| 0341570 | 11/1989 | European Pat. Off. . |
| 0341358 | 11/1989 | European Pat. Off. . |
| 0373912 | 6/1990 | European Pat. Off. . |
| 0453363 | 10/1991 | European Pat. Off. . |
| 0488552 | 6/1992 | European Pat. Off. . |
| 0505312 | 9/1992 | European Pat. Off. . |
| 3109166 | 1/1983 | Germany . |
| 3119876 | 12/1983 | Germany . |
| 4-322611 | 11/1992 | Japan . |
| 5-095978 | 4/1993 | Japan . |
| 8902202 | 3/1991 | Netherlands . |
| 1404038 | 9/1992 | United Kingdom . |
| WO9006739 | 6/1990 | WIPO . |

*Primary Examiner*—Bentsu Ro
*Attorney, Agent, or Firm*—Poms, Smith, Lande & Rose, P.C.

[57] ABSTRACT

In an articulated bed having a motor for raising and lowering the bed, a control circuit operated by the user has first user memory for storing a first user variable indicating a user-selected first preferred bed position and a recall button by which the user can command that a handler routine in the control circuit return the bed to the first preferred bed position indicated by the first user variable. Further, the control circuit can have a tracking memory for frequently storing a tracking variable indicating the current position of the bed and a "store" or "program" button or control by which the user can command that the first user variable be set to equal the current tracking variable. Thus, any time the bed is a position preferred by the user, the user can push the store button to store a user variable indicating the preferred bed position in the controller's memory; then afterwards the user can have the bed return to that preferred position by pressing the recall button.

23 Claims, 7 Drawing Sheets

U.S. PATENT DOCUMENTS 4,231,019 10/1980 Junginger .
4,232,901 11/1980 Harrington et al. .
4,264,849 4/1981 Fleischer et al. .......................... 318/568
4,294,048 10/1981 Sutter .
4,401,928 8/1983 Kamijo et al. .......................... 318/466
4,435,862 3/1984 King et al. .
4,639,959 2/1987 Roca .
4,680,790 7/1987 Packard et al. .
4,712,105 12/1987 Kohler .
4,769,584 9/1988 Irigoyen et al. .
4,787,104 11/1988 Grantham .
4,798,197 1/1989 Nippoldt et al. .
4,825,200 4/1989 Evans et al. .
4,845,415 7/1989 Steely .................................... 318/568.1
4,845,620 7/1989 Parker .................................... 318/466 X
4,850,040 7/1989 Teich et al. .
4,878,055 10/1989 Kasahara .
4,888,536 12/1989 Sakai et al. .............................. 318/592
4,999,622 3/1991 Amano et al. .
5,044,029 9/1991 Vrzalik .
5,053,636 10/1991 Zelina .
5,058,871 10/1991 Cogin et al. .
5,062,167 11/1991 Thomas et al. .
5,063,623 11/1991 Bathrick et al. .
5,063,624 11/1991 Smith et al. .
5,072,463 12/1991 Willis .
5,073,999 12/1991 Thomas et al. .
5,098,089 3/1992 Harrington et al. .
5,107,554 4/1972 Garakani .
5,140,235 8/1992 Ahmed et al. .
5,235,258 8/1993 Schuerch .
5,239,300 8/1993 Berger .
5,449,987 9/1995 McMillan ................................ 318/266

USER-CONTROLLABLE ADJUSTABLE MASSAGE BED

CROSS-REFERENCE TO RELATED APPLICATION

This is a divisional of application Ser. No. 08/189,963, filed Jan. 31, 1994, now U.S. Pat. No. 5,544,376, issued Aug. 13, 1996.

BACKGROUND OF THE INVENTION

The present invention relates to articulated beds adjustable by electric motors or their equivalent to support the person in the bed in different positions as desired, and more specifically to beds that can be operated by a handheld unit coupled to the bed by a wire or wireless link.

Although adjustable beds have long been found useful in hospital and institutional settings, in recent years such beds have been made convenient for more universal use by adding lifting and vibrator massage motors controllable by a handheld controller. For example, U.S. Pat. No. 5,235,258 entitled REMOTELY CONTROLLED ARTICULATED BED describes an articulated bed manipulated by head and foot motors and vibrated by head and foot vibrator motors which are controlled by a wireless remote unit.

However, there is a danger that as more controllable features and options are added to such "automatic" beds they actually may become more difficult and frustrating to use. For example, if head and foot portions of the bed can be put in countless different positions and the head and foot vibrators can be set for a variety of speeds and massage patterns, the user may find it difficult to restore the bed to a favored setting once it has been readjusted for some reason. Moreover, if previously the bed has been left in a chair-like curved position, a tired or distraught person wanting to just lie on the bed in a more conventional position may not be in the mood to "play" with the controls.

Thus, it would be highly desirable if there were some way the user could easily make the bed automatically return to a favored "bed setting," without adding greatly to the cost of the bed or complexity in operating it. But any mechanism which causes such a bed to automatically adjust its shape significantly might present a danger to a handicapped, sick or feeble person who inadvertently triggers the mechanism and cannot immediately bring it to a halt. Therefore, such a feature cannot be added without first devising some foolproof way for even a surprised or frightened person to easily halt any such automatic motion.

Accordingly, it is an object of the invention to provide an articulated bed and a method and device for operating it by which the user can customize several favorite settings of the bed's lifting and massaging motors and of even associated equipment, such as a bed lamp or television. A further object is to provide a safety mechanism by which even a surprised or frightened person can halt such an automatic adjustment motion of the bed.

SUMMARY OF THE INVENTION

In an articulated bed having a motor for raising and lowering the bed, a control circuit operated by the user has first user memory for storing a first user variable indicating a user-selected first preferred bed position and a recall button by which the user can command that a handler routine in the control circuit return the bed to the first preferred bed position indicated by the first user variable. Further, the control circuit can have a tracking memory for frequently storing a tracking variable indicating the current position of the bed and a "store" or "program" button or control by which the user can command that the first user variable be set to equal the current tracking variable. Thus, any time the bed is in a position preferred by the user, the user can push the store button to store a user variable indicating the preferred bed position in the controller's memory; then afterwards the user can have the bed return to that preferred position by pressing the recall button.

Bed controllers usually have a number of control buttons for controlling different elements and functions of the bed. As a safety feature, whenever the bed is moving automatically in response to the recall button, pressing any button on the handheld controller halts and aborts the recall. Thus, even a user surprised or frightened by the "recall" movement of the bed will be able to halt the bed by pressing any key on the handheld control.

For storing the user's preferred "bed state," sufficient memory is provided for storing all of the user's preferred settings. For example, on a bed where the head and foot position, head and foot massage speed and pulse mode, and remote and bed-attached electric outlets are all controllable, all their settings are stored by pressing one program key (for example, labeled "p") and one memory location (for example, memory key 1); all the settings are recalled just by pressing the same memory location key (for example, memory key 1).

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

Figure 1:
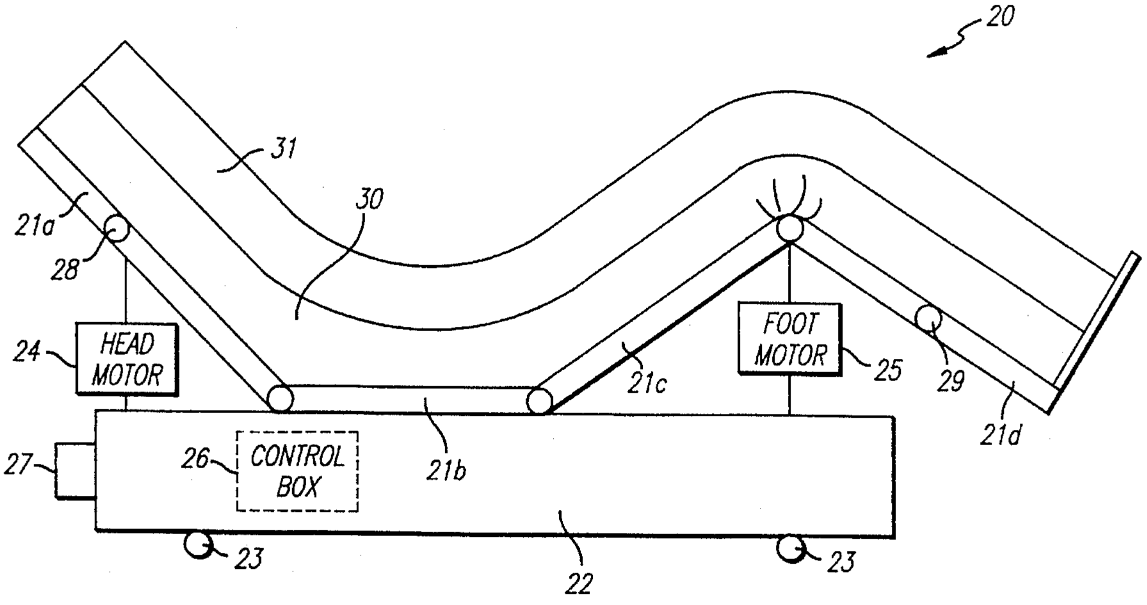
FIG. 1 is a simplified mechanical diagram showing a right side elevation of an embodiment of an articulated, motor-driven bed according to the invention.

As shown in the simplified mechanical diagram of FIG. 1, an articulated, motor-driven bed shown generally at 20 have an articulated support plate 21_a_, 21_b_, 21_c_, 21_d_ is mounted on a base 22 having wheels or casters 23. Preferably the support plate is covered with a cloth-covered foam layer 30 and if desired a flexible mattress 31. The support plate is moved by electrical head and foot lifting motors 24 and 25, which are controlled by wire by an electrical circuit in a control box 26, attached to base 22, which responds to control signals from a handheld control. As will be seen below, the handheld control itself can be coupled to control box 26 by a wireless (radio or infrared) link.

An auxiliary box 27 having AC power sockets also controllable (ON/OFF, lamp dimming) by the handheld control for appliances, can also be wired to control box 26 and attached to bed base 22. Electrical head and foot vibrators (massage motors) 28, 29 respectively mounted on head (21_a_) and foot (21_d_) portions of the support plate can also be wired to control box 26 to regulate their ON/OFF times, speed, and pulse operation in response to user choices with the handheld control.

Figure 2:
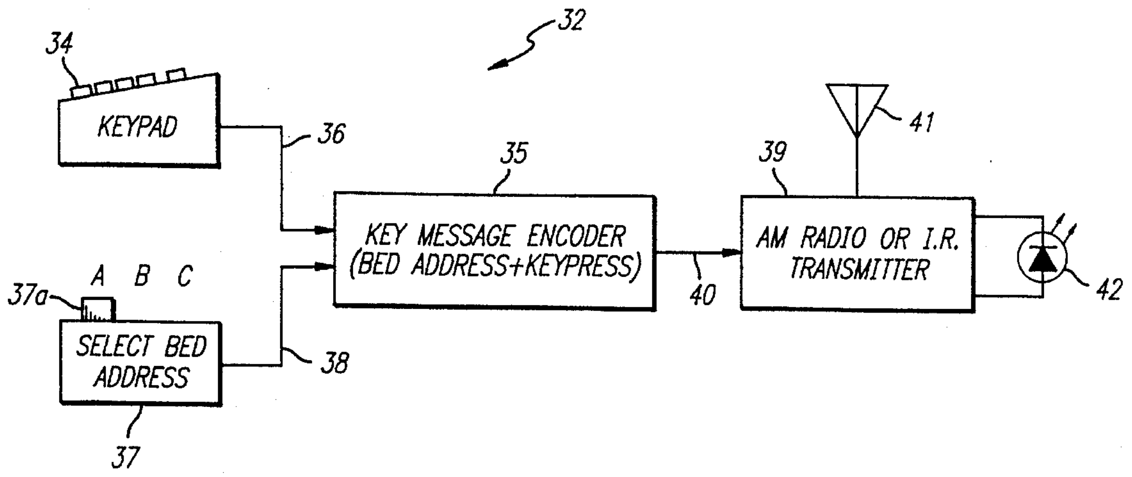
FIG. 2 is a block diagram of an embodiment of a handheld, wireless remote control transmitter unit for controlling the bed of FIG. 1.

The handheld control, wireless remote control transmitter unit shown generally at 32 in FIG. 2 can be used to control the bed's lifting motors 24, 25 and vibration motors 28, 29 and auxiliary box 27 via control box 26. Transmitter unit 32 has a keypad 34 (all see FIG. 4) which the person controlling the bed (typically the person on the bed or nurse) presses to generate electrical motor, vibrator, and auxiliary function command signals for bed control box 26. The command signals are input in parallel to a key message encoder 35 which incorporates a bed address (A, B, C) selected with switch 37_a_ so each bed will only respond it its own corresponding transmitter. As will be seen below, the control box 26 on bed 20 also has an A, B, C address switch which can be set to match the address of its corresponding transmitter.

Encoder 35 can be a Motorola MC145026 encoder chip, in which case input lines from the keypad 34 are not simple binary, but can have one of three DC signal voltage states (High Voltage (H), Low Voltage (L), or Open Circuit (O)). As shown in Charts 2A–2C below, encoder 35 generates a unique nine-digit key code of H's, L's and O's corresponding to each key pressed. A bed with an "A" address can be programmed to recognize that only encoded key command signals from an Address A transmitter never have a Low (L) signal in lines 1 and 2. A bed with a "B" address can be programmed to recognize that an Address B transmitter always sends a Low (L) signal on line 1, whereas an Address C bed should look for the Low (L) signals an Address C transmitter puts on line 2.

Referring to FIG. 2, encoder 35 sends the encoded signals as a serial signal 40 to AM transmitter 39, which can be a conventional radio transmitter (for example, at three hundred MHz) with antenna 41 or a conventional infrared transmitter 42.

Figure 3:
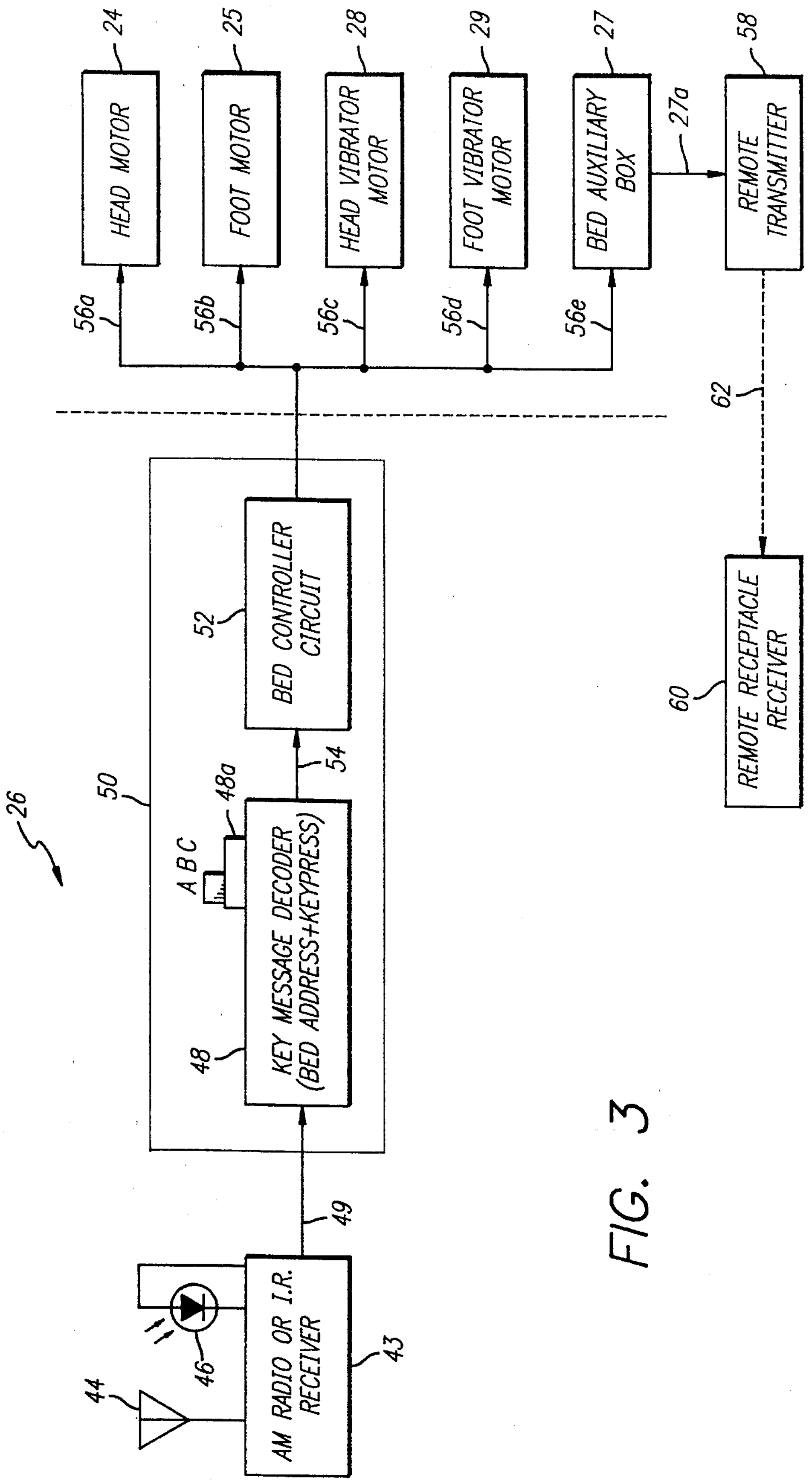
FIG. 3 is a block diagram of an embodiment of a remote control receiver unit according to the invention, mounted on the bed of FIG. 1 for receiving wireless control signals from the remote control transmitter of FIG. 2.

As shown in FIG. 3, the control box 26 of FIG. 1 has a corresponding AM radio or an infrared receiver 43 using a receiving antenna 44 or infrared-detecting diode 46. Receiver 43 demodulates the received command signals and passes them as a serial signal to a bed controller unit 50 which has a key message decoder 48 followed by a bed controller circuit 52. Key message decoder 48 on bed 20 is set to match the corresponding transmitter for A, B, or C bed addresses by an ABC switch 48_a_. The decoded key commands are input to bed controller circuit 52, which includes driver circuits (see FIG. 6) which enable the key commands to control head and foot motors 24, 25, head and foot vibrator motors 28, 29, and bed auxiliary box 27. Bed auxiliary box 27 can include a low frequency remote AM radio transmitter 58 (for example having a ten KHz carrier) which can pass control signals using the building electrical wiring 62 to a remote receptacle 60 plugged into an electrical socket elsewhere in the building in which the bed 20 is located.

Figure 4:
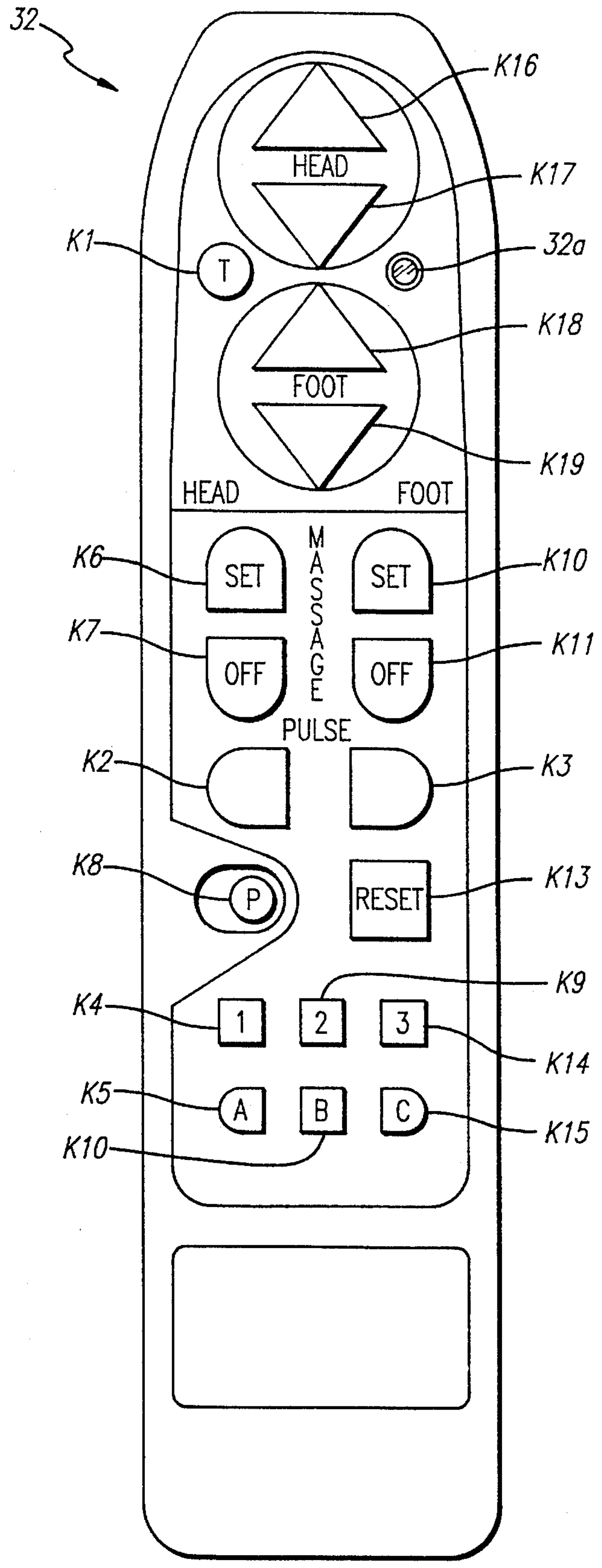
FIG. 4 is a face view of the handheld remote control transmitter unit of FIG. 2 showing the labeled control buttons.

As shown in FIG. 4, handheld remote control transmitter 32 unit having a power indicator light 32_a_ has a number of specially labeled keys whose functions are summarized in Chart 1. The user can press a key to have the head motor 24 raise (K16) or lower (K17) the head 21_a_ portion of the bed, to have the foot motor 25 raise (K18) or lower (K19) the foot portion 21_d_ of the bed. A key (K1) labeled "T" for "timer" starts a thirty minute timer for the head and foot vibrator motors 28, 29, either of which can be shut off before the thirty minute interval ends by a corresponding OFF key (K7, K11). By successively pressing head and foot vibrator MASSAGE SET keys (K6, K10) the speed of the head and foot vibrator motors 28, 29 can be changed in the order HIGH, LOW and MEDIUM.

When vibrator motors 28, 29 are running, they can be shifted between preset pulse rhythms by successively pressing HEAD and FOOT MASSAGE PULSE keys (K2, K3). The available pulse rhythms are NORMAL (no pulsing) or pulsed intervals: FAST (two seconds ON, two seconds OFF), MEDIUM (four seconds ON, four seconds OFF), and SLOW (six seconds ON, six seconds OFF). A bed RESET key (K13) makes head and foot motors 24, 25 return the bed 20 to level and shuts off vibrator motors 28, 29.

CHART 1 - KEY COMMAND SCHEME

| KEY NAME | KEY # | VARIABLE AFFECTED | KEY EVENT | COMMAND |
|---|---|---|---|---|
| TIMER | K1 | TIME_REMAINING | PRESS DOWN | START MASSAGE (IF OFF)<br>STOP MASSAGE (IF ON) |
| HEAD PULSE | K2 | Cur_Head_Massage_Pulse_Mode | PRESS DOWN | FAST -> MEDIUM -> SLOW -><br>NO_PULSE |
| FOOT PULSE | K3 | Cur_Foot_Massage_Pulse_Mode | PRESS DOWN | FAST -> MEDIUM -> SLOW -><br>NO_PULSE |
| MEMORY 1 | K4 | 1ST_BED_STATE<br>(Memory Data Structure) | PRESS DOWN<br>(Prog)<br>PRESS DOWN<br>(Recall) | STORE<br>CURRENT_BED_STATE<br>RECALL<br>1ST_BED_STATE |
| AUX A (ALARM) | K5 | Cur_Remote_Alarm | PRESS DOWN | REMOTE ALARM ON/<br>REMOTE APPLIANCE ON |
| HD MASSAGE SET | K6 | Cur_Head_Massage_Speed | PRESS DOWN | SPEED: HIGH -> LOW -><br>MEDIUM |
| HD MASSAGE OFF | K7 | Cur_Head_Massage_Off | PRESS DOWN | HEAD MASSAGE OFF |
| PROGRAM | K8 | Program_Mode | PRESS DOWN | ENTER PROGRAM MODE |

-continued

| | | | | |
|---|---|---|---|---|
| MEMORY 2 | K9 | 2ND_BED_STATE<br>(Memory Data Structure) | PRESS DOWN<br>(Prog)<br>PRESS DOWN<br>(Recall) | STORE<br>CURRENT_BED_STATE<br>RECALL<br>2ND_BED_STATE |
| FT MASSAGE SET | K10 | Cur_Foot_Massage_Speed | PRESS DOWN | SPEED: HIGH -> LOW -><br>MEDIUM |
| FT MASSAGE OFF | K11 | Cur_Foot_Massage_Off | PRESS DOWN | FOOT MASSAGE OFF |
| RESET | K13 | Reset_Mode | PRESS DOWN | HEAD & FOOT TO LEVEL,<br>MASSAGE MOTORS OFF |
| MEMORY 3 | K14 | 3RD_BED_STATE<br>(Memory Data Structure) | PRESS DOWN<br>(Prog)<br>PRESS DOWN<br>(Recall) | STORE<br>CURRENT_BED_STATE<br>RECALL<br>3RD_BED_STATE |
| AUX C (DIMMER) | K15 | Cur_C_Dimmer | PRESS DOWN | AUX OUTLET C:<br>ON -> DIM -> DIMMER -><br>DIMMEST |
| HEAD UP | K16 | Cur_Head_Position | PRESS DOWN | HEAD MOTOR UP |
| HEAD DOWN | K17 | Cur_Head_Position | PRESS DOWN | HEAD MOTOR DOWN |
| FOOT UP | K18 | Cur_Foot_Position | PRESS DOWN | FOOT MOTOR UP |
| FOOT DOWN | K19 | Cur_Foot_Position | PRESS DOWN | FOOT MOTOR DOWN |
| AUX B (ON/OFF) | K10 | Cur_Aux_On | PRESS DOWN | AUX OUTLET B ON |

| | | KEY CODE | | | | | | | | |
|---|---|---|---|---|---|---|---|---|---|---|
| KEY NAME | KEY # | LINE 1 | LINE 2 | LINE 3 | LINE 4 | LINE 5 | LINE 6 | LINE 7 | LINE 8 | LINE 9 |
| | | CHART 2A - KEY CODES FOR ADDRESS A | | | | | | | | |
| TIMER | 1 | H | O | O | O | O | H | O | O | O |
| HEAD PULSE | 2 | O | H | O | O | O | H | O | O | O |
| FOOT PULSE | 3 | O | O | H | O | O | H | O | O | O |
| MEMORY 1 | 4 | O | O | O | H | O | H | O | O | O |
| AUX A (ALARM) | 5 | O | O | O | O | H | H | O | O | O |
| HD MASSAGE SET | 6 | H | O | O | O | O | O | H | O | O |
| HD MASSAGE OFF | 7 | O | H | O | O | O | O | H | O | O |
| PROGRAM | 8 | O | O | H | O | O | O | H | O | O |
| MEMORY 2 | 9 | O | O | O | H | O | O | H | O | O |
| FT MASSAGE SET | 10 | H | O | O | O | O | O | O | H | O |
| FT MASSAGE OFF | 11 | O | H | O | O | O | O | O | H | O |
| RESET | 13 | O | O | H | O | O | O | O | H | O |
| MEMORY 3 | 14 | O | O | O | H | O | O | O | H | O |
| AUX C (DIMMER) | 15 | O | O | O | O | H | O | O | H | O |
| HEAD UP | 16 | H | O | O | O | O | O | O | O | H |
| HEAD DOWN | 17 | O | H | O | O | O | O | O | O | H |
| FOOT UP | 18 | O | O | H | O | O | O | O | O | H |
| FOOT DOWN | 19 | O | O | O | H | O | O | O | O | H |
| AUX B (ON/OFF) | 10 | O | O | O | O | H | O | O | O | H |
| | | CHART 2B - KEY CODES FOR ADDRESS B | | | | | | | | |
| TIMER | 1 | L | O | O | O | O | H | O | O | O |
| HEAD PULSE | 2 | L | H | O | O | O | H | O | O | O |
| FOOT PULSE | 3 | L | O | H | O | O | H | O | O | O |
| MEMORY 1 | 4 | L | O | O | H | O | H | O | O | O |
| AUX A (ALARM) | 5 | L | O | O | O | H | H | O | O | O |
| HD MASSAGE SET | 6 | L | O | O | O | O | O | H | O | O |
| HD MASSAGE OFF | 7 | L | H | O | O | O | O | H | O | O |
| PROGRAM | 8 | L | O | H | O | O | O | H | O | O |
| MEMORY 2 | 9 | L | O | O | H | O | O | H | O | O |
| FT MASSAGE SET | 10 | L | O | O | O | O | O | O | H | O |
| FT MASSAGE OFF | 11 | L | H | O | O | O | O | O | H | O |
| RESET | 13 | L | O | H | O | O | O | O | H | O |
| MEMORY 3 | 14 | L | O | O | H | O | O | O | H | O |
| AUX C (DIMMER) | 15 | L | O | O | O | H | O | O | H | O |
| HEAD UP | 16 | L | O | O | O | O | O | O | O | H |
| HEAD DOWN | 17 | L | H | O | O | O | O | O | O | H |
| FOOT UP | 18 | L | O | H | O | O | O | O | O | H |
| FOOT DOWN | 19 | L | O | O | H | O | O | O | O | H |
| AUX B (ON/OFF) | 10 | L | O | O | O | H | O | O | O | H |
| | | CHART 2C - KEY CODES FOR ADDRESS C | | | | | | | | |
| TIMER | 1 | H | L | O | O | O | H | O | O | O |
| HEAD PULSE | 2 | O | L | O | O | O | H | O | O | O |
| FOOT PULSE | 3 | O | L | H | O | O | H | O | O | O |
| MEMORY 1 | 4 | O | L | O | H | O | H | O | O | O |
| AUX A (ALARM) | 5 | O | L | O | O | H | H | O | O | O |
| HD MASSAGE SET | 6 | H | L | O | O | O | O | H | O | O |
| HD MASSAGE OFF | 7 | O | L | O | O | O | O | H | O | O |
| PROGRAM | 8 | O | L | H | O | O | O | H | O | O |
| MEMORY 2 | 9 | O | L | O | H | O | O | H | O | O |
| FT MASSAGE SET | 10 | H | L | O | O | O | O | O | H | O |

-continued

| | | | | | | | | | | |
|---|---|---|---|---|---|---|---|---|---|---|
| FT MASSAGE OFF | 11 | O | L | O | O | O | O | O | H | O |
| RESET | 13 | O | L | H | O | O | O | O | H | O |
| MEMORY 3 | 14 | O | L | O | H | O | O | O | H | O |
| AUX C (DIMMER) | 15 | O | L | O | O | H | O | O | H | O |
| HEAD UP | 16 | H | L | O | O | O | O | O | O | H |
| HEAD DOWN | 17 | O | L | O | O | O | O | O | O | H |
| FOOT UP | 18 | O | L | H | O | O | O | O | O | H |
| FOOT DOWN | 19 | O | L | O | H | O | O | O | O | H |
| AUX B (ON/OFF) | 10 | O | L | O | O | H | O | O | O | H |

Figure 5:
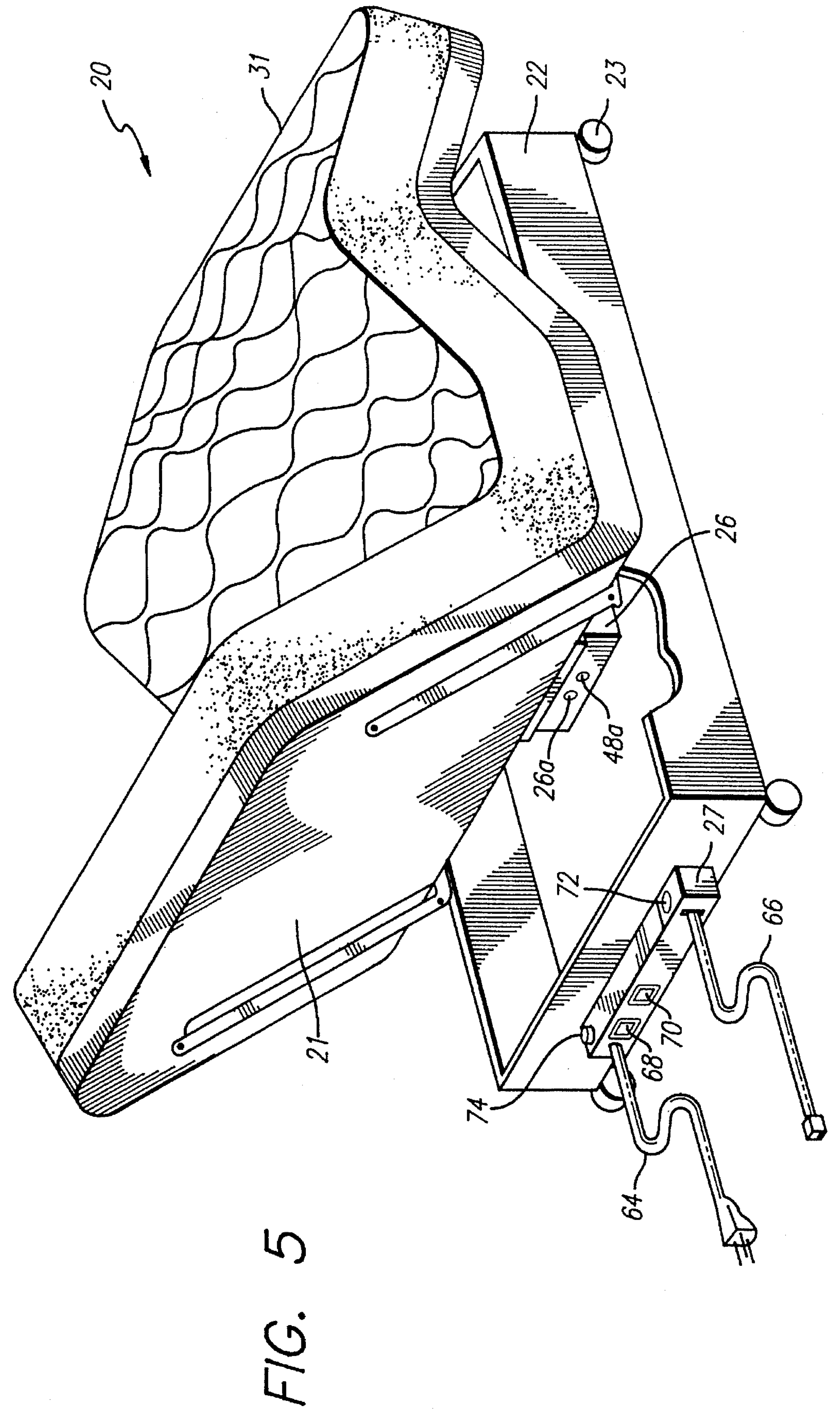
FIG. 5 is a more detailed, right rear perspective view of the motor-driven articulated bed of FIG. 1, showing how the remote control receiver of FIG. 2 and an auxiliary box can be mounted on the bed.

Another view of how control box 26 can be mounted under the bed 20 is shown in FIG. 5. Auxiliary box 27, which is attached at the rear of base 22, has its own AC power cord 64 and a low voltage control signal line 66 which plugs into a modular jack 26*a* on control box 26 to receive decoded key commands sent from handheld transmitter unit 32. As can be seen better in the block diagram of FIG. 8, auxiliary box 27 has an AC outlet 68 for an appliance and an AC outlet 70 which includes a dimmer for a lamp, both of which are controllable by the decoded key commands. An auxiliary ABC code switch 72 and a reset button 74 are also provided as shown in FIG. 5.

Figure 6:
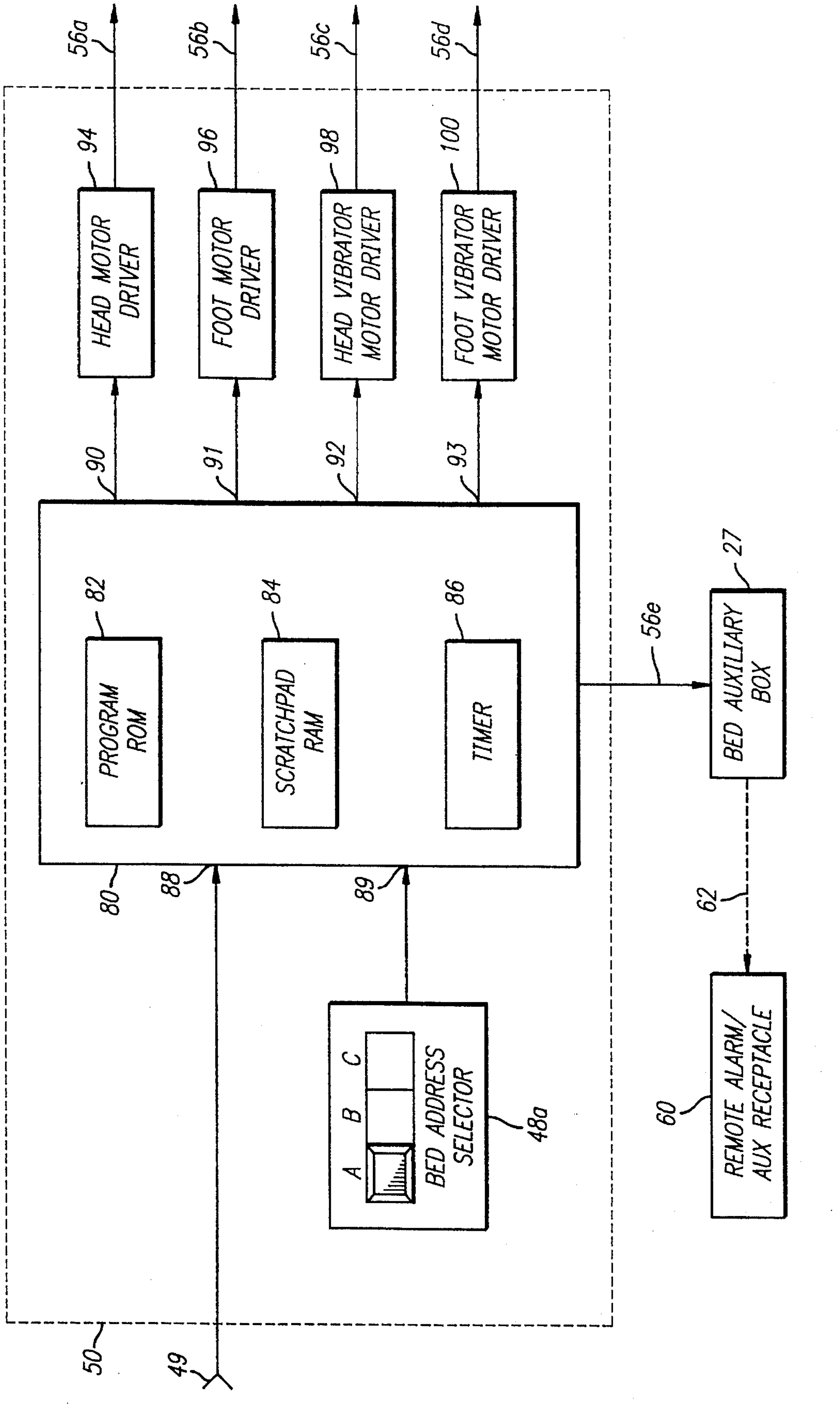
FIG. 6 is a detailed block diagram of a bed controller unit shown in the remote control receiver unit of FIG. 3.

FIG. 6 shows the computerized bed controller unit 50 which includes a programmed Intel LM80C22 microcomputer 80, which is similar to the Intel 8051 microcomputer. Microcomputer 80 has on board Read Only Memory (PROGRAM ROM) 82 for storing a control program (see FIG. 7) and a scratchpad read/write random access memory (SCRATCHPAD RAM) 84 for storing variables and scratchpad calculations. It also has an on-board timer 86, useful for measuring the thirty minute run time for the vibrator motors 28, 29.

At terminal 89 Bed Address Selector 48*a* provides microcomputer 80 with a bed address selection (A, B, or C) set the same as the corresponding handheld transmitter's Bed Address. The received, demodulated encoded key messages are input on line 49 from receiver 43 to microcomputer terminal 88. Microcomputer 80 decodes the key command messages from the user and then at terminals 90, 91, 92, 93 sends appropriate digital control signals to driver circuits 94, 96, 98, 100 to control the head and foot motors 24, 25, head and foot vibrators 28, 29, and bed auxiliary box 27 to carry out the key commands.

Figure 7:
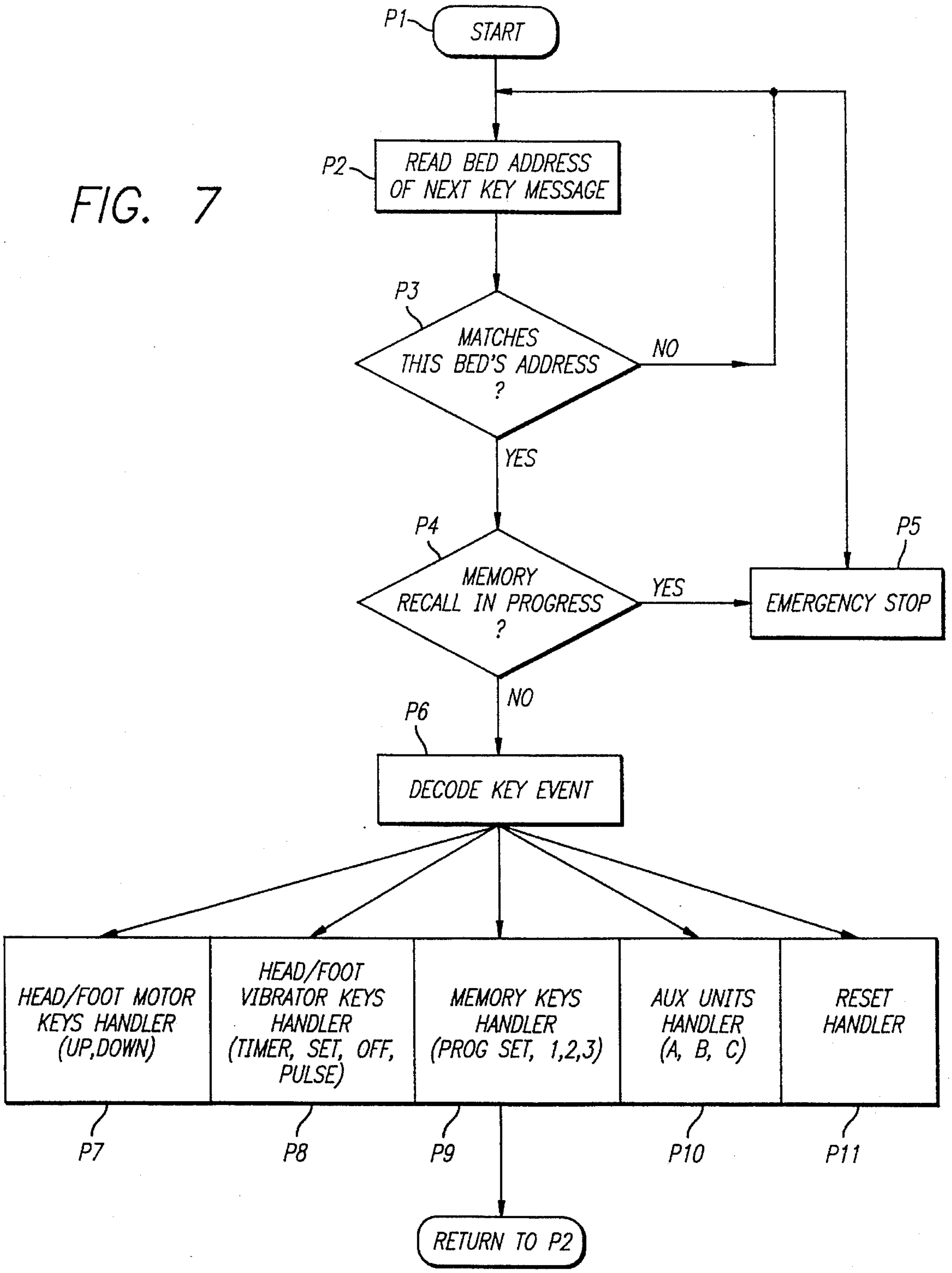
FIG. 7 is a flow chart of a control program for a microcomputer in the bed controller unit of FIG. 6.

FIG. 7 shows a flow chart of the controller program for microcomputer 80. At P2 the bed address of a key message is read and if at P3 the address does not match that of the microcomputer 80 the program loops back to P2 for the next message. If the bed address is correct at P3, a check is made at P4 to determine if the microcomputer is currently executing a memory recall. If it is, regardless of the key pressed, the microcomputer 80 performs an emergency stop at P5, and then loops back for the next message. If a memory recall is not in progress, the microcomputer 80 decodes the key command at P6 and then depending on the decoded command switches to an appropriate handler routine for the motors (P7), vibrators (P8), memory keys (P9), auxiliary units (P10), and bed reset function (P11). After the appropriate handler routine finishes, the program loops back to P2 for the next key message.

Chart 3 as set forth below is a chart of four memory structures (M1, M2, M3, M4) stored in a memory of the bed controller unit 50 of FIG. 6.

CHART 3
MEMORY DATA STRUCTURES

| | | | |
|---|---|---|---|
| CURRENT_BED_STATE: | | 1ST_BED_STATE: | |
| | M1 | | M2 |
| Cur_Head_Position | | 1st_Head_Position | |
| Cur_Foot_Position | | 1st_Foot_Position | |
| Cur_Head_Massage_Off | | 1st_Head_Massage_Off | |
| Cur_Foot_Massage_Off | | 1st_Foot_Massage_Off | |
| Cur_Head_Massage_Speed | | 1st_Head_Massage_Speed | |
| Cur_Foot_Massage_Speed | | 1st_Foot_Massage_Speed | |
| Cur_Head_Massage_Pulse_Mode | | 1st_Head_Massage_Pulse_Mode | |
| Cur_Foot_Massage_Pulse_Mode | | 1st_Foot_Massage_Pulse_Mode | |
| Cur_A_Remote_Alarm | | 1st_A_Remote_Alarm | |
| Cur_B_Aux_On | | 1st_B_Aux_On | |
| Cur_C-Dimmer | | 1st_C-Dimmer | |
| 2ND_BED_STATE: | | 3RD_BED_STATE: | |
| | M3 | | M4 |
| 2nd_Head_Position | | 3rd_Head_Position | |
| 2nd_Foot_Position | | 3rd_Foot_Position | |
| 2nd_Head_Massage_Off | | 3rd_Head_Massage_Off | |
| 2nd_Foot_Massage_Off | | 3rd_Foot_Massage_Off | |
| 2nd_Head_Massage_Speed | | 3rd_Head_Massage_Speed | |
| 2nd_Foot_Massage_Speed | | 3rd_Foot_Massage_Speed | |
| 2nd_Head_Massage_Pulse_Mode | | 3rd_Head_Massage_Pulse_Mode | |
| 2nd_Foot_Massage_Pulse_Mode | | 3rd_Foot_Massage_Pulse_Mode | |
| 2nd_A_Remote_Alarm | | 3rd_A_Remote_Alarm | |
| 2nd_B_Aux_On | | 3rd_B_Aux_On | |
| 2nd_C-Dimmer | | 3rd_C-Dimmer | |

As shown in Chart 3, the bed controller unit 50 includes an electronic random access memory (RAM) in which four memory data structures M1–M4 can each store a group of related variables indicating head and foot bed positions, head and foot massage (vibrator) ON/OFF states, speeds and pulse modes, and the states of three auxiliary devices. The RAM in which data structures M1–M4 are stored can be the scratchpad RAM 84 shown on board the microcomputer 80 of FIG. 6. The bed's three auxiliary devices are a remote alarm 60 controlled by the "A" key (K5) of handheld transmitter unit 32, an ON/OFF auxiliary outlet 68 controlled by the "B" key (K10), and a lamp dimmer outlet 70 controlled by the "C" key (K15).

A memory data structure is a collection of related variables stored in memory which, as a group, convey a particular meaning—here the total controllable state of the bed 20. Each time bed controller unit 50 adjusts the bed position, the vibrator settings, or the states of auxiliary devices 60, 68, 70 it updates memory data structure M1 so that the current values of the variables making up structure M1 indicated the current controllable state of bed 20 and its auxiliary devices.

When the user of handheld transmitter unit 32 presses its program key P (K8) followed by its "1" memory key (K4), bed controller unit 50 responds by setting the values of memory structure M2 equal to the current values of structure M1. Thus, structure M2 preserves a first bed state which can later be recalled simply by pressing the "1" memory key (K4) to control the bed 20 back to that state when the user presses the "1" memory key again. The "2" (K9) and "3" (K14) memory keys work in a similar manner to store second and third bed states for recall later.

As a safety feature, whenever any of the memory keys "1," "2," or "3" has been pressed to recall a previous bed state, pressing any button on the handheld controller halts and aborts the recall. Thus, even a user surprised or frightened by the "recall" movement of the bed 20 can easily halt the bed without a special STOP or EMERGENCY key.

Figure 8:
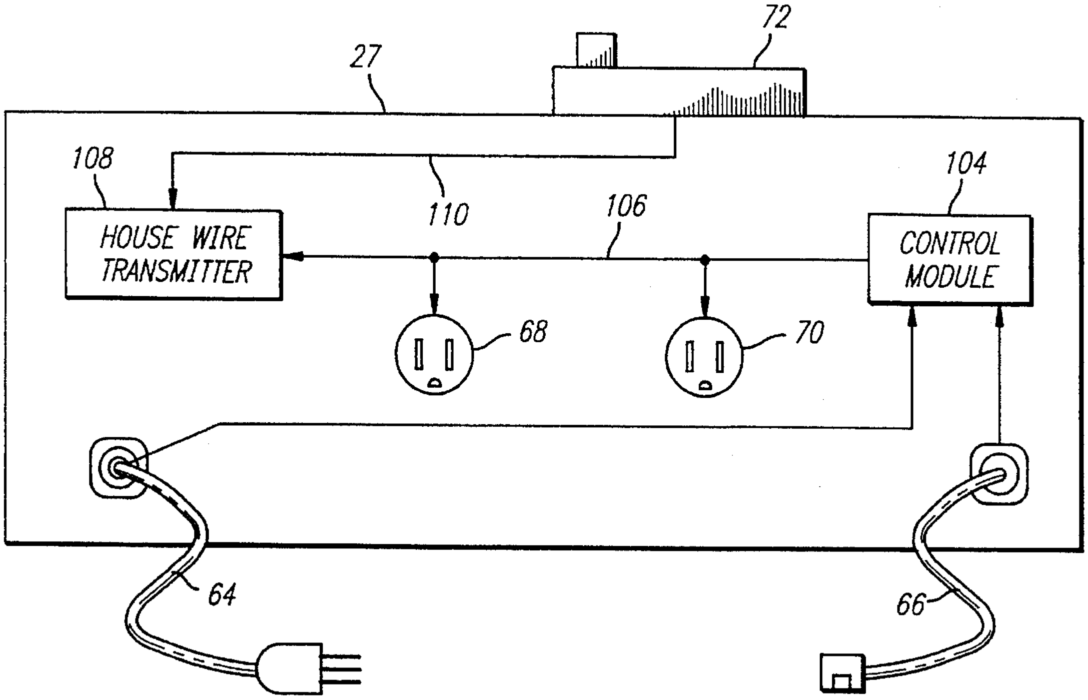
FIG. 8 is a front elevation of the bed-mounted auxiliary box of FIG. 5.

FIG. 8 is a front elevational view of the bed-mounted auxiliary box 27 of FIG. 5. It shows a bed address switch ABC 72, AC outlet 68, AC outlet 70, AC power cord 64, signal line 66, control module 104, lines 106, 110 and house wire transmitter 108.

Figure 9:
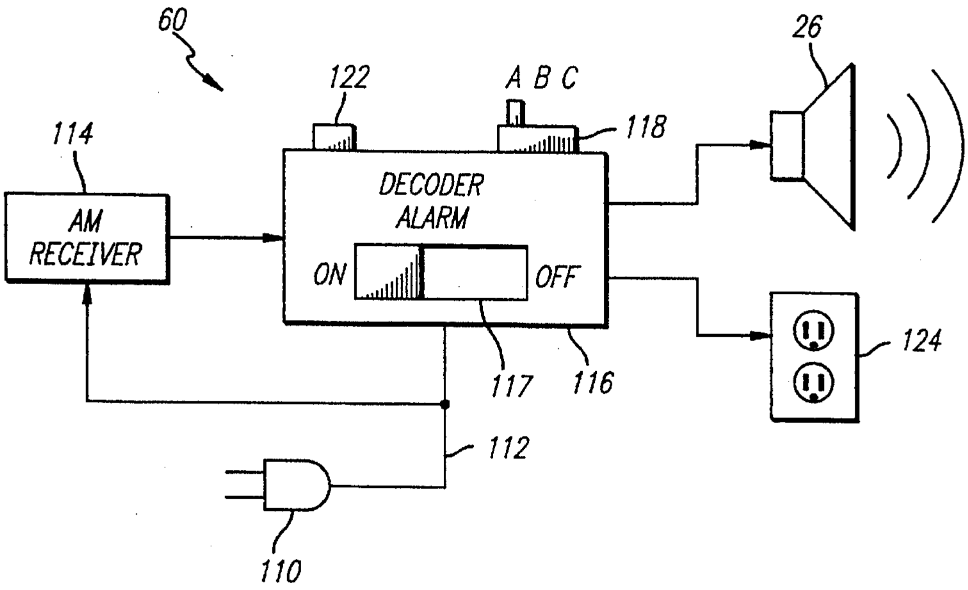
FIG. 9 is a block diagram of a controllable remote alarm/auxiliary receptacle box according to the invention which is controlled by radio signals transmitted from the bed along the internal AC wires of the building.

FIG. 9 is a block diagram of a controllable remote alarm/auxiliary receptacle box according to the invention which is controlled by radio signals transmitted from the bed along the internal AC wires of the building. It shows AC line voltage at 110, line 112, AM receiver 114, decoder 116 with alarm 117 (having left and right "on" and "off" positions), ABC switch 118, reset 122, and auxiliary AC outlet 124.

While the present invention is described with reference to particular embodiments, those skilled in the art will recognize that many variations may be employed without departing from the spirit and scope of the invention as set forth in the claims. For example, the illustrated embodiments use a wireless handheld remote control transmitter unit 32 but the inventive memory and safety features would still be present if the transmitter were wired to control box 26. Similarly if the bed to be controlled has a different combination of lifting motors, vibrators and auxiliary units, the details of Memory Structures M1–M4 can be correspondingly modified while still employing the claimed invention.

In other words, from the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

I claim:

1. A user-controllable adjustable massage bed, comprising:

(a) a vibratory articulated bed including:
- a bed base;
- back, seat, thigh and foot support plates articulated relative to one another and supported by said base, said support plates being adapted for supporting a mattress;
- a head motor for controllably lifting said back support plate and thereby a head section of the mattress when supported;
- a foot motor for controllably lifting said thigh support plate and thereby a thigh section of the mattress; and
- a vibratory massage motor for vibrating at least one of said support plates and thereby a corresponding section of the mattress; and (b) a remote-control handheld unit including:
- a first user-activated mechanism for controlling the operation of at least one of said foot and head motors; and
- a second user-activated mechanism for shifting an on-off cycling rhythm of said massage motor between first and second different rhythms with said massage motor running.

2. The bed of claim 1 wherein said second user-activated mechanism includes the shifting thereof being with said massage motor running at a constant speed.

3. The bed of claim 2 wherein the constant speed can be alternatively different first and second speeds, and said handheld unit includes user-activated means for selecting between the first and second speeds.

4. The bed of claim 1 wherein said vibratory massage motor comprises a head vibratory motor for vibrating said back support plate and thereby the mattress head section.

5. The bed of claim 1 wherein said vibratory massage motor comprises a foot vibratory massage motor for vibrating said foot support plate and thereby a foot section of the mattress.

6. The bed of claim 5 wherein said vibratory articulated bed further includes a head vibratory massage motor for vibrating said back support plate and thereby the mattress head section.

7. The bed of claim 6 wherein said handheld unit further includes a third user-activated mechanism for shifting an on-off cycling rhythm of said head vibratory massage motor between first and second different rhythms with said head vibratory massage motor running.

8. The bed of claim 7 wherein said second and third user-activated mechanisms comprise different handheld unit buttons.

9. The bed of claim 1 wherein said second user-activated mechanism is user manipulatable between different first and second conditions for the first and second different rhythms, respectively.

10. The bed of claim 1 wherein said second user-activated mechanism comprises a button which is depressed once for the first rhythm and twice for the second rhythm.

11. The bed of claim 1 wherein said second user-activated mechanism shifts the on-off cycling rhythm among the first and second rhythms and a third different rhythm with said massage motor running.

12. The bed of claim 11 wherein the first rhythm is a two seconds on and two seconds off cycle, the second rhythm is a four seconds on and four seconds off cycle, and the third rhythm is a six seconds on and six seconds off cycle.

13. The bed of claim 11 wherein said second user-activated mechanism comprises a button which is depressed once for the first rhythm, twice for the second rhythm and thrice for the third rhythm.

14. The bed of claim 11 wherein said handheld unit includes user-activated means for changing the speed of said vibratory massage motor among first and second different running speeds.

15. The bed of claim 14 wherein the shifting of said second user-activated mechanism is with said massage motor running alternatively at said first and second running speeds.

16. The bed of claim 15 wherein said second user-activated mechanism comprises a first button, and said user-activated means comprises a second button.

17. The bed of claim 1 wherein said handheld unit includes user-activated means for selectively changing the speed of said vibratory massage motor among first, second and third different predetermined running speeds.

18. The bed of claim 17 wherein said user-activated means comprises a key which is successively pressed for the first, second and third running speeds.

19. The bed of claim 1 wherein said handheld unit comprises a wireless remote-control handheld unit.

20. The bed of claim 1 wherein said first user-activated mechanism controls the operation of said head motor, and said handheld unit further includes a third user-activated mechanism for controlling the operation of said foot motor.

21. A user-controllable adjustable massage bed, comprising:

(a) a vibratory articulated bed including:
- a bed base;
- back, seat, thigh and foot support plates articulated relative to one another and supported by said base, said support plates being adapted for supporting a mattress;
- a head motor for controllably lifting said back support plate and thereby a head section of the mattress when supported
- a foot motor for controllably lifting said thigh support plate and thereby a thigh section of the mattress; and
- a vibratory massage motor for vibrating at least one of said support plates and thereby a corresponding section of the mattress; and (b) a wireless remote-control handheld unit including:
- a first user-activated mechanism for controlling the operation of at least one of said foot and head motors;
- a second user-activated mechanism for shifting an on-off cycling rhythm of said massage motor between first and second different rhythms with said massage motor running at a constant speed which can be alternatively different first and second speeds; and
- a third user-activated mechanism for selecting between the first and second speeds.

22. The bed of claim 21 wherein said second user-activated mechanism includes a handheld unit button which is depressed a different number of times to select between the first and second rhythms.

23. The bed of claim 21 wherein said vibratory massage motor defines a first vibratory massage motor, said vibratory articulated bed further includes a second vibratory massage motor for vibrating another one of said support plates and thereby a corresponding another section of the mattress, and said handheld unit further includes a fourth user-activated mechanism for shifting an on-off cycle rhythm of said second massage motor between first and second different rhythms.

* * * * *